United States Patent [19]
Miyoshi

[11] Patent Number: 6,013,001
[45] Date of Patent: Jan. 11, 2000

[54] BICYCLE SPROCKET HAVING RECESSES BENEATH CHAIN RECEIVING EDGES

[75] Inventor: Hiroyuki Miyoshi, Sakai, Japan

[73] Assignee: Shimano, Inc., Osaka, Japan

[21] Appl. No.: 09/018,447

[22] Filed: Feb. 4, 1998

[51] Int. Cl.[7] .................................................. F16H 55/12
[52] U.S. Cl. ........................ 474/160; 474/156; 474/164
[58] Field of Search ................................... 474/160, 164, 474/159, 152, 153, 162, 155–157

[56] References Cited

U.S. PATENT DOCUMENTS

| | | | |
|---|---|---|---|
| 4,889,521 | 12/1989 | Nagano | 474/164 |
| 5,437,582 | 8/1995 | Romano | 474/160 X |
| 5,503,598 | 4/1996 | Neuer et al. | 474/78 |
| 5,503,600 | 4/1996 | Berecz | 474/160 |
| 5,514,042 | 5/1996 | Liou | 474/160 |
| 5,545,096 | 8/1996 | Su | 474/160 |

FOREIGN PATENT DOCUMENTS

| | | | |
|---|---|---|---|
| 2469624 | 5/1981 | France | F16H 9/24 |
| 50-39941 | 4/1975 | Japan | F16H 55/30 |
| 1-41675 | 12/1989 | Japan | B62M 9/10 |

Primary Examiner—Tamara L. Graysay
Assistant Examiner—Marcus Charles
Attorney, Agent, or Firm—James A. Deland

[57] ABSTRACT

A bicycle sprocket includes a sprocket body having a first lateral side surface, a second lateral side surface opposite the first lateral side surface, and an inner peripheral surface. A plurality of teeth extend radially outwardly from the sprocket body and define a corresponding plurality of chain connector receiving spaces with a corresponding plurality of bottom edges between each pair of adjacent teeth, wherein each bottom edge receives a chain connector therein. The first lateral side surface defines a first recess extending radially inwardly from selected ones of the plurality of bottom edges, and the first lateral side surface defines a second recess extending radially inwardly from other selected ones of the plurality of bottom edges and spanning their corresponding pairs of adjacent teeth. The first lateral side surface forming each pair of adjacent teeth corresponding to the other selected ones of the plurality of bottom edges also defines the second recess for facilitating shifting of the chain from a smaller sprocket to a larger sprocket, while the first recesses prevent buildup of contaminants between the sprocket teeth.

14 Claims, 3 Drawing Sheets

BICYCLE SPROCKET HAVING RECESSES BENEATH CHAIN RECEIVING EDGES

BACKGROUND OF THE INVENTION

The present invention is directed to bicycle sprockets and, more particularly, to a bicycle sprocket having recesses formed on a lateral side surface of the sprocket.

It is often desirable to construct bicycle sprockets as lightweight as possible to help reduce the overall weight of the bicycle. Furthermore, mountain bicycles are often ridden in very muddy terrain. As a result, mud tends to build up between the sprocket teeth, thus interfering with proper meshing of the chain with the sprocket teeth.

JP 1-41675 discloses a sprocket formed from a very thin plate with recesses formed on both lateral sides of the sprocket. The very small thickness of the plate and the recesses on both lateral sides of the sprocket tend to weaken the sprocket, so the sprocket is formed with an undulating cross sectional shape to add strength. Forming such an undulating shape complicates the manufacturing process, and the sprocket is still relatively weak.

JP 50-39941 discloses a sprocket having cutout portions adjacent to each sprocket tooth in addition to chamfers on both lateral sides of the sprocket. The cutout portions tend to weaken the load carrying ability of the sprocket teeth, and the recesses further weaken the sprocket body. Thus, it is still desirable to have a sprocket that has sufficient strength while also preventing buildup of contaminants between the sprocket teeth.

SUMMARY OF THE INVENTION

The present invention is directed to a bicycle sprocket having recesses beneath the chain receiving edges to prevent buildup of contaminants between the sprocket teeth without sacrificing sprocket strength. In one embodiment of the present invention, a bicycle sprocket includes a sprocket body having a first lateral side surface, a second lateral side surface opposite the first lateral side surface, and an inner peripheral surface. A plurality of teeth extend radially outwardly from the sprocket body and define a corresponding plurality of chain connector receiving spaces with a corresponding plurality of bottom edges between each pair of adjacent teeth, wherein each bottom edge receives a chain connector therein. The first lateral side surface defines a first recess extending radially inwardly from selected ones of the plurality of bottom edges, and the first lateral side surface defines a plurality of second recess extending radially inwardly from other selected ones of the plurality of bottom edges and spanning their corresponding pairs of adjacent teeth. The first lateral side surface forming each pair of adjacent teeth corresponding to the other selected ones of the plurality of bottom edges also defines the second recess for facilitating shifting of the chain from a smaller sprocket to a larger sprocket, while the first recesses prevent buildup of contaminants between the sprocket teeth. To minimize the impact of the recesses on the strength of the sprocket, the recesses may be formed on only one side of the sprocket.

In another embodiment of the present invention, each first recess may be defined by first and second parallel edges spaced apart in the circumferential direction. Such edges allow the first recesses to be formed easily and minimize the risk that the tool forming the first recesses will slip during manufacture. This is especially true if the distance between the first and second edges is constant along substantially the entire length of the first and second edges. This embodiment may be used with or without the second recesses.

In another embodiment of the present invention, the sprocket body may be formed by two concentric rings coupled together by a plurality of arms that extend outwardly from the inner ring. This embodiment adds further weight savings without sacrificing strength of the sprocket.

DETAILED DESCRIPTION OF THE EMBODIMENTS

Figure 1:
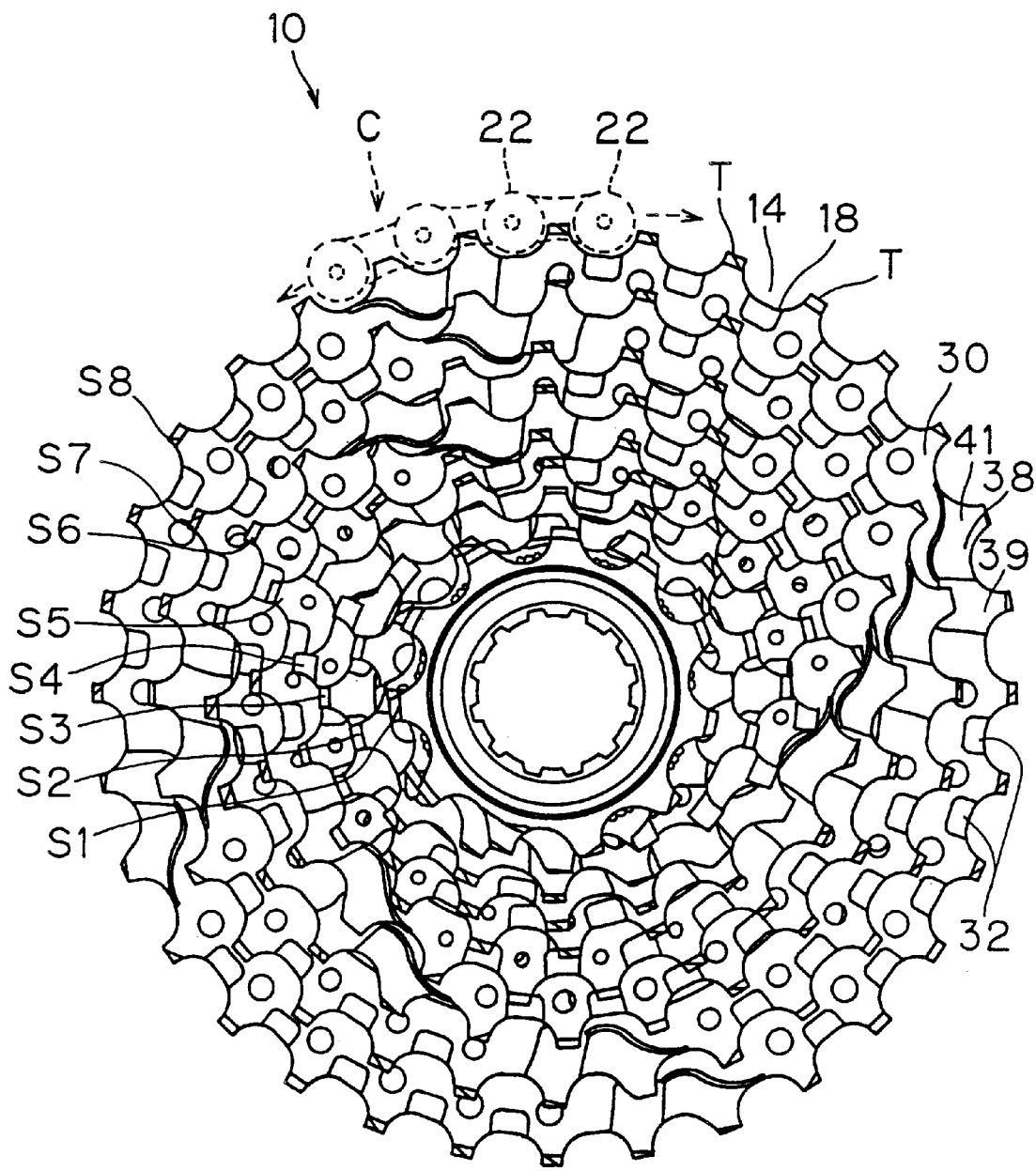
FIG. 1 is a front view of a particular embodiment of a sprocket cluster according to the present invention.

FIG. 1 is a front view of a particular embodiment of a sprocket cluster 10 according to the present invention. Sprocket cluster 10 includes a plurality, e.g., eight sprockets S1–S8 coaxially mounted together in a conventional way. In general, each sprocket S1–S8 includes a plurality of teeth T that define a plurality of chain receiving spaces 14 having a corresponding plurality of bottom edges 18 between each pair of adjacent teeth T. Each chain receiving space 14 and its corresponding bottom edge 18 receives a single chain connector such as a chain roller 22 of a chain C.

In this embodiment, a first lateral side surface 30 of each sprocket S3–S8 defines a first recess 32 extending radially inwardly from selected ones of the plurality of bottom edges 18. Recesses 32 help prevent contaminants such as mud from building up in its corresponding chain receiving space 14 which would interfere with meshing of chain C with teeth T. Recesses 32 also reduce the overall weight of the sprocket. The first lateral side surface 30 of each sprocket S3–S8 also defines a second recess 38 extending radially inwardly from other selected ones of the plurality of bottom edges 18 and spanning their corresponding pairs of adjacent teeth T. The first lateral side surface 30 forming each pair of adjacent teeth T corresponding to the other selected ones of the plurality of bottom edges 18 also defines the second recess. Each second recess 38 is used to facilitate shifting of the chain from a smaller sprocket to a larger sprocket (such as from sprocket S7 to sprocket S8). The size, shape, placement and orientation of second recesses 38 and their distribution among the various sprockets S3–S8 may be made in accordance with the teachings of U.S. Pat. No. 4,889,521, incorporated herein by reference. In this embodiment, each second recess 38 is formed as a stepped recess having second recess portions 39 and 41, wherein second recess portion 39 is approximately 0.3 millimeters deep, and second recess portion 41 is approximately 0.6 millimeters deep.

Figure 2:
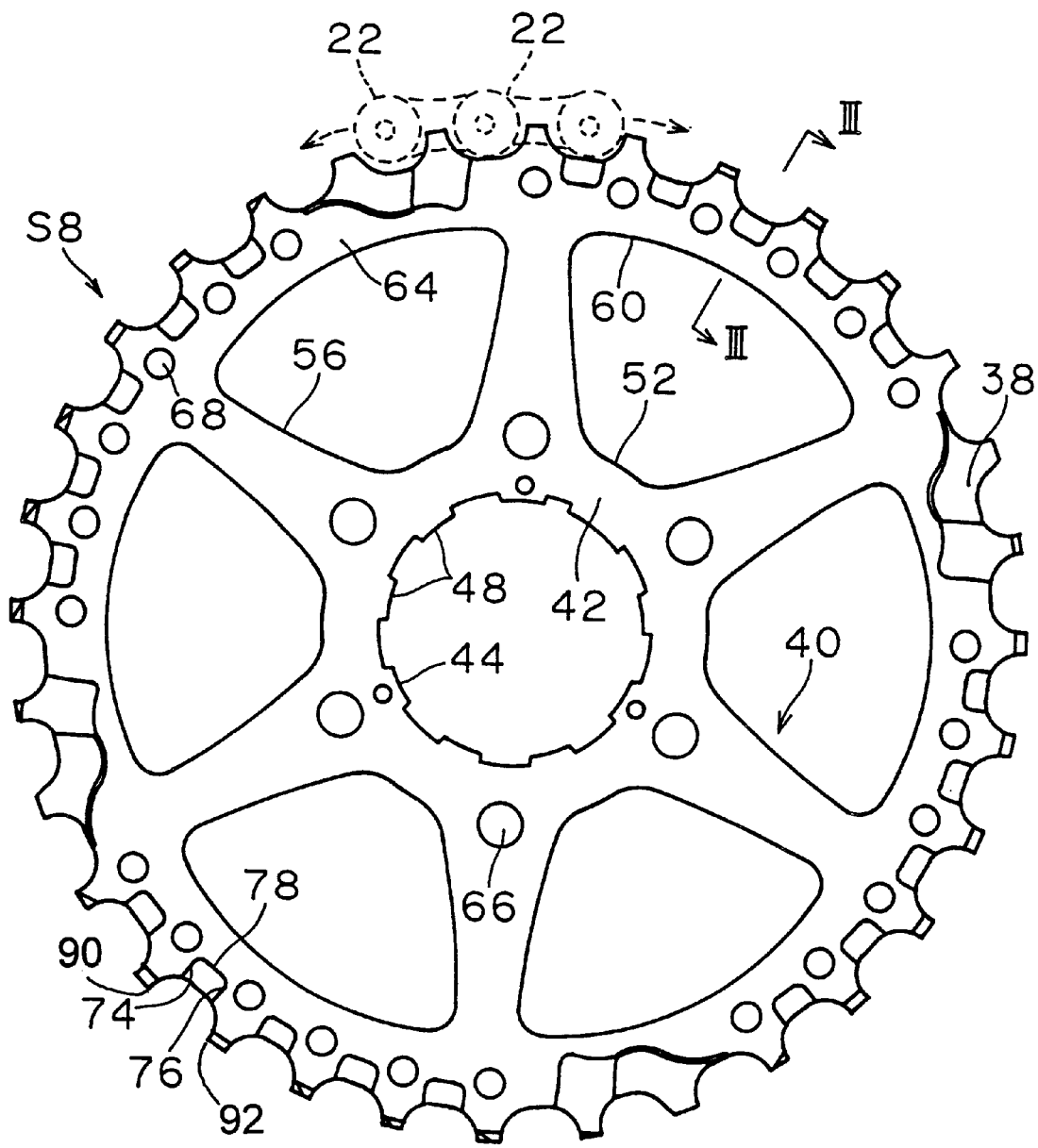
FIG. 2 is a front view of a particular embodiment of a sprocket according to the invention used in the sprocket cluster shown in FIG. 1.
Figure 3:
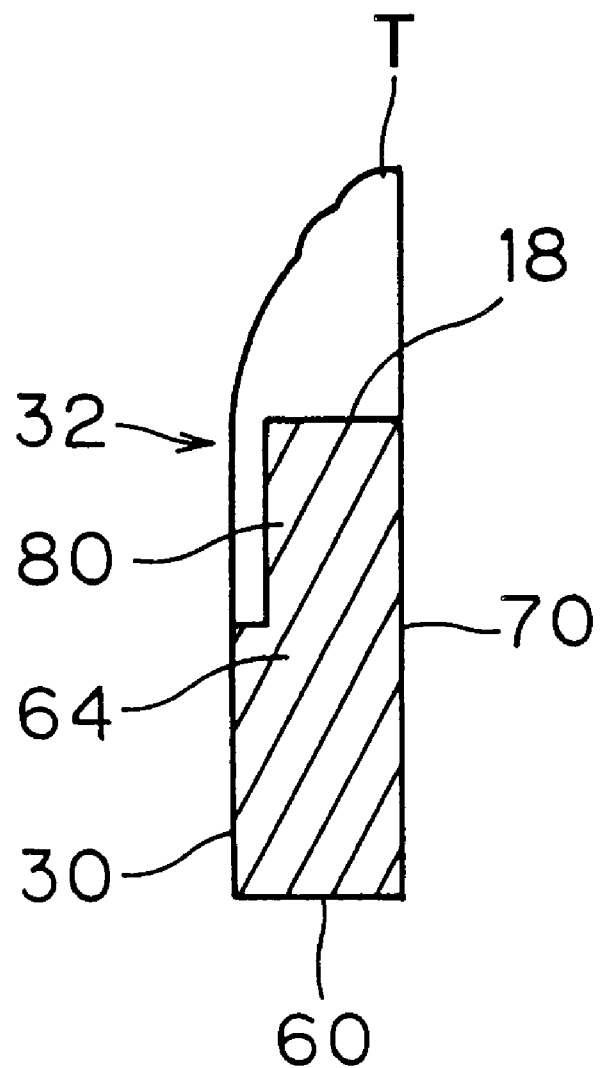
FIG. 3 is a view taken along line III—III in FIG. 2.

FIG. 2 is a front view of a particular embodiment of a sprocket, e.g., sprocket S8, according to the present invention, and FIG. 3 is a view taken along line III—III in FIG. 2. The other sprockets may be constructed similarly. As shown in FIGS. 2 and 3, sprocket S8 includes a sprocket body 40 comprising a first ring 42 having a first inner peripheral surface 44 defining a plurality of splines 48 and a first outer peripheral surface 52. A plurality of arms 56 extend radially outwardly from the first outer peripheral surface 52 and connect to a second inner peripheral surface 60 of a second ring 64. Teeth T extend radially outwardly from the outer peripheral surface of second ring 64 for meshing with chain C as noted above. If desired, a plurality of through holes 66 may be formed in first ring 42, and a plurality of through holes 68 may be formed in second ring 64 to further reduce the weight of the sprocket.

As shown more particularly in FIG. 3, the second ring 64 (as well as first ring 42 and arms 56) has first lateral side surface 30 and a second lateral side surface 70 opposite first lateral side surface 30. Unlike prior art structures, in this embodiment there is no recess equivalent to recess 32 on the second lateral side surface 30. Instead, second lateral side surface 70 is straight from bottom edge 18 to inner peripheral surface 60.

In this embodiment, each recess 32 is defined by first and second parallel edges 74 and 76 spaced apart in the circumferential direction, wherein each edge 74 and 76 is straight for substantially its entire length. Edges 74 and 76 originate between opposed upper facing corners 90 and 92 of their corresponding pair of adjacent teeth. Thus, a distance D between edges 74 and 76 is constant along substantially the entire length of edges 74 and 76. The parallel edges 74 and 76 allow the first recesses 32 to be formed easily and minimize the risk that the tool forming the first recesses 32 will slip during manufacture. A straight bottom edge 78 perpendicular to both edges 74 and 76 forms the radially inner border of each recess 32. Each recess 32 may be, for example, 0.5 millimeters deep and 5 millimeters wide, wherein the bottom surface 80 of each recess is flat in all directions and parallel to first lateral side surface 30 and second lateral side surface 70.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Thus, the scope of the invention should not be limited by the specific structures disclosed. Instead, the true scope of the invention should be determined by the following claims.

What is claimed is:

1. A bicycle sprocket comprising:
   a sprocket body including:
      a first lateral side surface;
      a second lateral side surface opposite the first lateral side surface; and
      an inner peripheral surface;
   a plurality of teeth extending radially outwardly from the sprocket body and defining a corresponding plurality of chain connector receiving spaces with a corresponding plurality of bottom edges between opposed upper facing corners of each pair of adjacent teeth, wherein each bottom edge receives a chain connector therein;
   wherein the first lateral side surface defines a recess extending radially inwardly from selected ones of the plurality of bottom edges; and
   wherein each recess is defined by first and second parallel edges spaced apart in the circumferential direction and originating between the opposed upper facing corners of its corresponding pair of adjacent teeth.

2. A bicycle sprocket comprising:
   a sprocket body including:
      a first lateral side surface;
      a second lateral side surface opposite the first lateral side surface; and
      an inner peripheral surface;
   a plurality of teeth extending radially outwardly from the sprocket body and defining a corresponding plurality of chain connector receiving spaces with a corresponding plurality of bottom edges between opposed upper corners of each pair of adjacent teeth, wherein each bottom edge receives a chain connector therein;
   wherein the first lateral side surface defines a recess extending radially inwardly from selected ones of the plurality of bottom edges;
   wherein each recess is defined by first and second edges spaced apart in the circumferential direction and originating between the opposed upper facing corners of its corresponding pair of adjacent teeth; and
   wherein a distance between each pair of first and second edges is constant along substantially their entire length.

3. The sprocket according to claim 2 wherein each first and second edge is straight.

4. The sprocket according to claim 3 wherein each recess has a straight bottom recess edge perpendicular to each of its corresponding first and second edges.

5. A bicycle sprocket comprising:
   a sprocket body including:
      a first lateral side surface;
      a second lateral side surface opposite the first lateral side surface; and
      an inner peripheral surface;
   a plurality of teeth extending radially outwardly from the sprocket body and defining a corresponding plurality of chain connector receiving spaces with a corresponding plurality of bottom edges between opposed upper corners of each pair of adjacent teeth, wherein each bottom edge receives a chain connector therein;
   wherein the first lateral side surface defines a first recess extending radially inwardly from selected ones of the plurality of bottom edges;
   wherein each first recess is defined by first and second edges spaced apart in the circumferential direction and originating between the opposed upper facing corners of its corresponding pair of adjacent teeth;
   wherein the first lateral side surface defines a second recess extending radially inwardly from other selected ones of the plurality of bottom edges and spanning their corresponding pairs of adjacent teeth; and
   wherein the first lateral side surface forming each pair of adjacent teeth corresponding to the other selected ones of the plurality of bottom edges also defines the second recess.

6. A bicycle sprocket comprising:
   a sprocket body including:
      a first ring having a first inner peripheral surface and a first outer peripheral surface;
      a plurality of arms extending radially outwardly from the first outer peripheral surface;
      a second ring disposed radially outwardly from the first ring;
      wherein the second ring has a second inner peripheral surface connected to the plurality of arms, a first lateral side surface, and a second lateral side surface;
   a plurality of teeth extending radially outwardly from the second ring and defining a corresponding plurality of chain connector receiving spaces with a corresponding plurality of bottom edges between opposed upper facing corners of each pair of adjacent teeth, wherein each bottom edge receives a chain connector therein;
   wherein the first lateral side surface defines a first recess extending radially inwardly from selected ones of the plurality of bottom edges;
   wherein each first recess is defined by first and second edges spaced apart in the circumferential direction and originating between the opposed upper facing corners of its corresponding pair of adjacent teeth; and wherein the first lateral side surface defines a second recess extending radially inwardly from other selected ones of the plurality of bottom edges and spanning their corresponding pairs of adjacent teeth.

7. The sprocket according to claim 6 wherein the first lateral side surface forming each pair of adjacent teeth corresponding to the other selected ones of the plurality of bottom edges also defines the second recess.

8. The sprocket according to claim 7 wherein the second lateral side surface is straight from the selected ones of the plurality of bottom edges to the second inner peripheral surface.

9. The sprocket according to claim 8 wherein each first recess is defined by first and second straight parallel edges spaced apart in the circumferential direction.

10. The sprocket according to claim 9 wherein each first recess has a straight bottom recess edge along its entire length perpendicular to each of its corresponding first and second edges.

11. A bicycle sprocket comprising:

a sprocket body including:

a first ring having a first inner peripheral surface and a first outer peripheral surface;

a plurality of arms extending radially outwardly from the first outer peripheral surface;

a second ring disposed radially outwardly from the first ring;

wherein the second ring has a second inner peripheral surface connected to the plurality of arms, a first lateral side surface, and a second lateral side surface;

a plurality of teeth extending radially outwardly from the second ring and defining a corresponding plurality of chain connector receiving spaces with a corresponding plurality of bottom edges between opposed upper facing corners of each pair of adjacent teeth, wherein each bottom edge receives a chain connector therein;

wherein the first lateral side surface defines a first recess extending radially inwardly from selected ones of the plurality of bottom edges;

wherein the first lateral side surface defines a second recess extending radially inwardly from other selected ones of the plurality of bottom edges and spanning their corresponding pairs of adjacent teeth; and wherein each first recess is defined by first and second parallel edges spaced apart in the circumferential direction and originating between the opposed upper facing corners of its corresponding pair of adjacent teeth.

12. The sprocket according to claim 11 wherein a distance between each pair of first and second edges is constant along substantially their entire length.

13. The sprocket according to claim 12 wherein each first and second edge is straight along its entire length.

14. The sprocket according to claim 13 wherein each recess has a straight bottom recess edge along its entire length perpendicular to each of its corresponding first and second edges.

* * * * *